United States Patent [19]

Lesko

[11] Patent Number: 4,584,884

[45] Date of Patent: Apr. 29, 1986

[54] TORQUE SENSOR

[76] Inventor: Gerald J. Lesko, 12012-39A Ave., Edmonton, Alberta, Canada

[21] Appl. No.: 714,940

[22] Filed: Mar. 22, 1985

[51] Int. Cl.$^4$ ................................................ G01L 3/14
[52] U.S. Cl. ............................... 73/862.19; 73/862.49
[58] Field of Search ............ 73/862.19, 862.31, 862.49

[56] References Cited

U.S. PATENT DOCUMENTS 2,718,782  9/1955  Steinbruegge et al. .......... 73/862.19
4,435,988  3/1984  Corry et al. ...................... 73/862.19

FOREIGN PATENT DOCUMENTS 0427243  9/1948  Italy ................................. 73/862.19

Primary Examiner—Charles A. Ruehl
Attorney, Agent, or Firm—Ernest Peter Johnson

[57] ABSTRACT

The sensor comprises a pair of shafts mounted end to end for rotation within a stationary housing. The adjacent ends of the shafts are spaced apart by a thrust bearing so that axial force can be transmitted from the first shaft, connected to motor means, to the second shaft, connected to load means, but the first shaft can still oscillate relative to the second shaft. A sleeve encases the adjacent ends of the shafts. Balls, positioned in grooves formed in the sleeve and second shaft, lock the two together for rotational movement but enable the sleeve to slide longitudinally. Helical slots are cut in the sleeve portion encasing the first shaft. The first shaft carries cam followers which engage the slots. When torque is applied to the first shaft, the cam followers force the sleeve to move longitudinally in proportion to the torque. The sleeve biases a piston which pressurizes hydraulic fluid to actuate a Bourdon tube and provide a read-out of the torque measurement. The torque is transmitted from the first shaft through the balls to the second shaft and the shafts and sleeve rotate as a unit.

1 Claim, 5 Drawing Figures

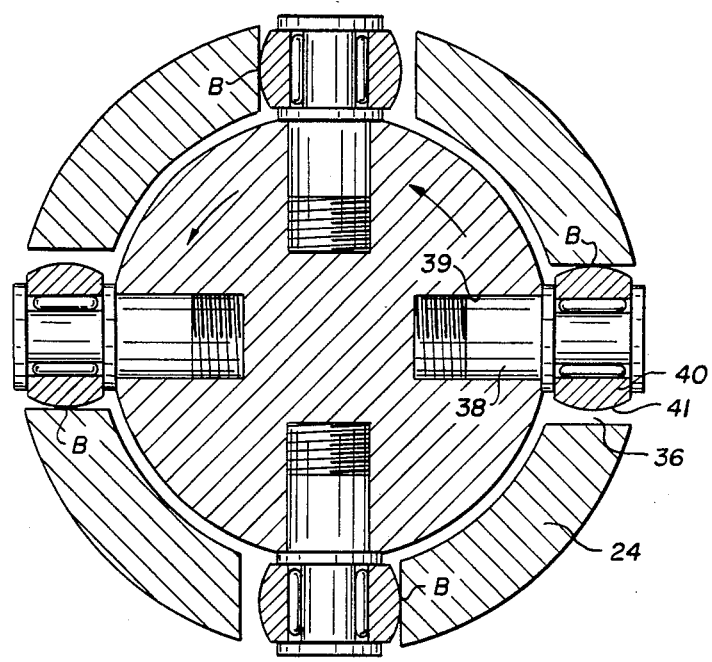

TORQUE SENSOR

FIELD OF THE INVENTION

This invention relates to a torque sensor which has particular application in the drive line connecting a drilling rig motor output shaft with the input shaft of the rotary table drive.

BACKGROUND OF THE INVENTION

There is a need for a torque sensor or indicator in the drive line to the rotary table of a drilling rig, to provide a warning when the torque needed to rotate the drilling string is rising—such a rise is frequently an indication that the drilling bit is seizing up.

A commonly used system for this purpose involves the use of a deflectable rubber wheel which is deflected by the return chain of the drive line. The wheel is moved against the resistance of a hydraulic indicator. One problem with this system is that the chain tends to cut into the rubber wheel until it reaches the wheel's steel hub, at which point damage occurs either to the chain or the hub. Still another problem is that the wheel and chain have to be aligned—a condition which is difficult to maintain. But the most significant problem is that the chain tends to flap, which causes the hydraulic indicator to show rapidly varying high and low values. Thus there is a time lag before the observer can identify a definite trend of increase in the indicated torque over the normal vibration of the indicator. So there are problems of endurance, maintenance and sensitivity associated with this type of sensor.

A second type of torque sensor in use on drilling rigs involves the use of strain gauges which actuate electronic signal means. This type of sensor has found only limited application, apparently because the electronic equipment tends to fail or becomes damaged in the rugged environment of a drilling rig.

So there is still a need for a torque sensor which:
is capable of monitoring high torque values;
provides accurate indications of the torque; and
is rugged, consistent and enduring, yet narrow and cylindrical in shape, so that it can be used in the crowded confines through which drilling rig drive lines extend.

There are other torque indicators of interest shown in the patent prior art. Of particular interest is U.S. Pat. No. 3,108,471, issued to Buchele et al. This patent discloses a sensor in which:
End to end shafts are provided, one of which is connected to the shaft of the motor and the other to the shaft of the load;
Each of the shafts carry radial flanges at their adjacent ends. The motor shaft flange has cone-shaped recesses formed in its forward face, which recesses are formed with inclined plane surfaces. The load shaft flange has axial apertures which correspond with the motor shaft recesses;
A ball seats in each recess and extends through the adjacent aperture;
At its forward end, the ball abuts a thrust bearing which can be biased to compress a diaphragm and thereby pressure hydraulic fluid behind the diaphragm. This hydraulic fluid actuates an indicator, such as a Bourdon tube.

There are certain concepts inherent in this prior art device, which concepts are of interest in the present case, namely:
as torque on the rotating motor shaft flange increases, the plane surfaces of the cone recess function to force the ball to move axially, thereby squeezing the diaphragm;
the ball interconnects the two shafts to transmit torque, so that they rotate together, while still enabling the axial force, indicative of torque, to be expressed as a longitudinal mechanical movement which can be used to actuate a hydraulic indicator system associated with the stationary housing of the assembly.

There are, however, certain problems associated with the Buchele et al design. More particularly, the spinning flange and ball assembly is sure to generate heat and this heat will expand the ball and the components connecting it with the diaphragm and cause the diaphragm to be compressed by the effect of thermal expansion. As a result, the indicated torque values will be misleading, being partly due to the thermal expansion. Also, the Buchele et al unit, due to its conceptual arrangement, would be short in length and wide in diameter, which would make it inappropriate for insertion in the crowded confines associated with the drive line of a drilling rig.

There are therefore further characteristics which would be desirable in a torque sensor, more particularly: it should be designed so that the torque readings are not affected by thermal expansion; and it should be relatively small in diameter.

SUMMARY OF THE INVENTION

In accordance with the present invention, a pair of shafts are mounted for rotation in end to end relation in a stationary housing. One such shaft (the "motor shaft") is connectable with the motor output shaft. The other (the "load shaft") is connectable with the load input shaft. A sleeve encases the adjacent ends of the motor and load shafts. The sleeve is slidably interconnected with the load shaft, so that they will "lock up" and rotate together, but the sleeve may still slide longitudinally. In the specific embodiment shown, this is done by providing circumferentially spaced grooves in each of the load shaft and sleeve and providing balls in the mating grooves. The balls function to transmit torque from the sleeve to the load shaft, while the sleeve can still slip longitudinally along the balls. A thrust bearing is positioned, preferably between the two end faces of the load and motor shafts, so that the shafts are spaced apart longitudinally, whereby axial force can be transmitted from the motor shaft to the load shaft but the motor shaft can still rotate or oscillate relative to the load shaft. The sleeve has a plurality of circumferentially spaced, helical slots formed in its wall, which slots provide slanted bearing surfaces, for a purpose to be described. The slots are downwardly slanted in the direction of rotation. The motor shaft carries a plurality of cam followers which extend into the sleeve slots. The motor and load shafts, being connected with the motor output shaft and load input shaft and being braced by suitable thrust bearings against the fixed housing, are fixed against axial movement, although they are free to rotate. When torque is applied to the motor shaft and resisted by load on the load shaft, the cam followers bear against the inclined slot walls and cause the sleeve to slide a short distance in a direction away from the load shaft. Concurrently, a solid coupling between the motor shaft, sleeve and load shaft is effected and the torque is therefore transmitted to the load shaft. At its first or motor shaft end, the sleeve comes into engagement with an indicator actuator. Preferably, this actuator is a piston which, when biased, pressurizes a body of hydraulic fluid filling a passageway extending through the housing and a conduit to a device, such as a Bourdon tube, for converting the pressure change to a visual signal. At its second end, the sleeve, when at rest, contacts the load shaft. This load shaft is axially fixed by a thrust bearing in contact with the housing—thus the second end of the sleeve at rest abuts axially fixed components. But when torque is applied, and heat is generated, the sleeve is displaced away from the aforesaid fixed components and thus it can expand due to heating without affecting the indicator assembly at its other end.

By achieving a solid coupling of the two shafts and sleeve, and by having a sleeve which is free to move longitudinally in response to the application of torque, and by anchoring the assembly in a rigid, fixed frame, none of radial loads, speed, heat, or side loading of the motor and load shafts by outside elements have been found to significantly affect the torque measurements. The sensor is cylindrical and compact. And, in use, it has demonstrated endurance.

Broadly stated, the invention is a torque sensor for use in the drive line connecting a motor means and a load means, comprising: a first shaft adapted to be connected to the longitudinally stationary output shaft of the motor means; a second shaft adapted to be connected to the longitudinally stationary input shaft of the load means; said first shaft being arranged end to end relative to the second shaft, said first and second shaft ends being spaced apart by thrust bearing means, whereby axial force may be transmitted from the first shaft to the second shaft and yet the first shaft may rotate relative to the second shaft; a sleeve encasing the adjacent ends of the first and second shafts; means for slidably interlocking the sleeve with the second shaft, whereby torque applied to the sleeve is transmitted to the second shaft, while permitting the sleeve to be moved longitudinally; said sleeve forming a plurality of circumferentially spaced, helically arranged slots in that portion of the sleeve encasing the first shaft end, said slots being slanted in the direction of rotation of the first shaft; said first shaft having a plurality of cam followers, each arranged to extend into one of the slots, to engage an inclined wall surface of said slots, whereby, as torque is applied to the first shaft, the cam followers transmit the torque to the sleeve and the sleeve advances along the first shaft in a direction away from the second shaft; a housing encasing the sleeve and adjacent ends of the first and second shafts, said housing being adapted to be fixed against movement; thrust bearing means disposed between the second shaft and the housing, whereby the second shaft may rotate but axial force applied to the second shaft by the first shaft is transmitted to the fixed housing; means, adapted to be biased by the sleeve when the latter moves longitudinally for generating a signal indicative of the extent of sleeve movement, thereby providing a measure of torque.

DESCRIPTION OF THE DRAWING

FIG. 5 is an enlarged end sectional view showing the motor shaft, cam followers, sleeve and slots.

DESCRIPTION OF THE PREFERRED EMBODIMENT

Figure 1:
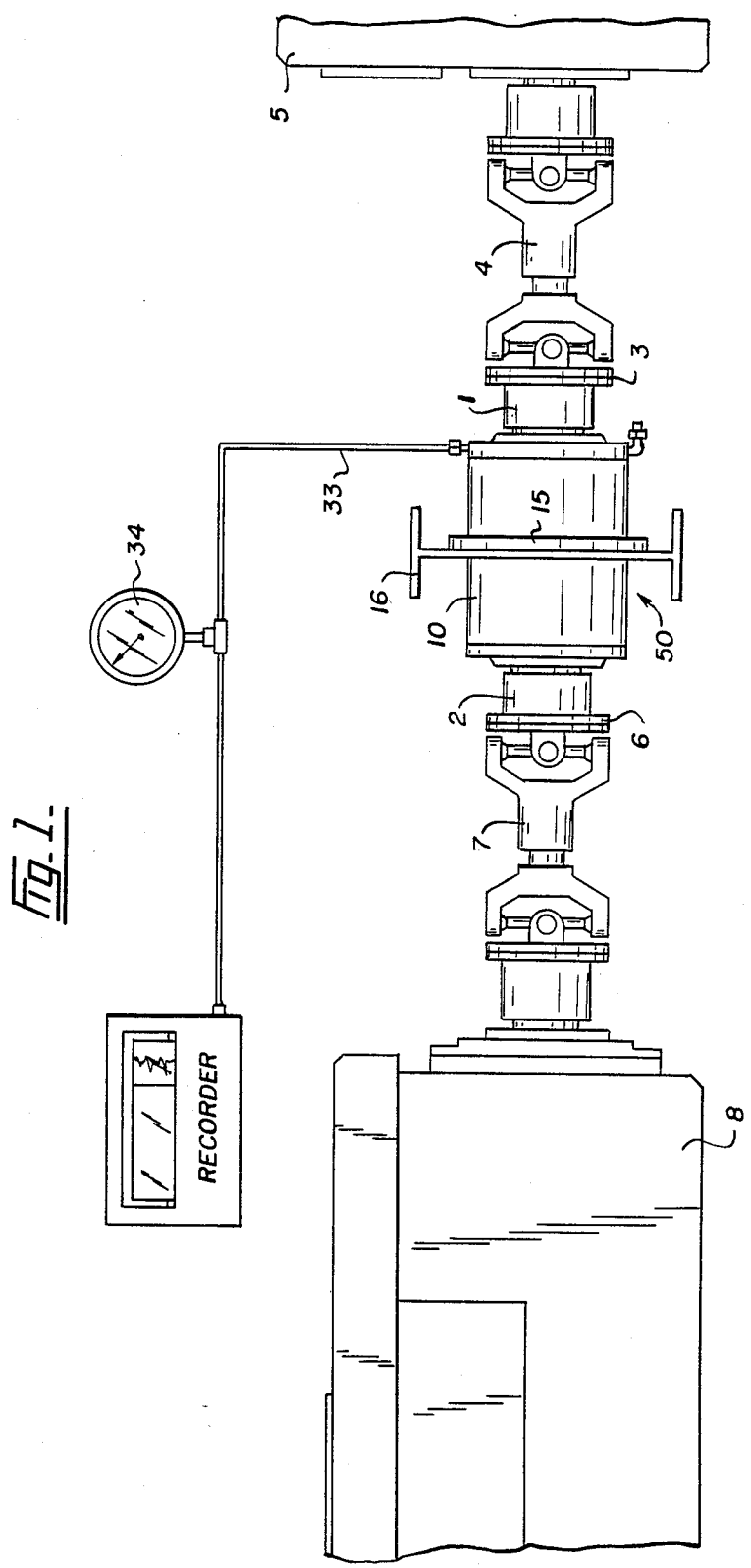
FIG. 1 is a schematic view showing the torque sensor incorporated in the drive line of a drilling rig.
Figure 2:
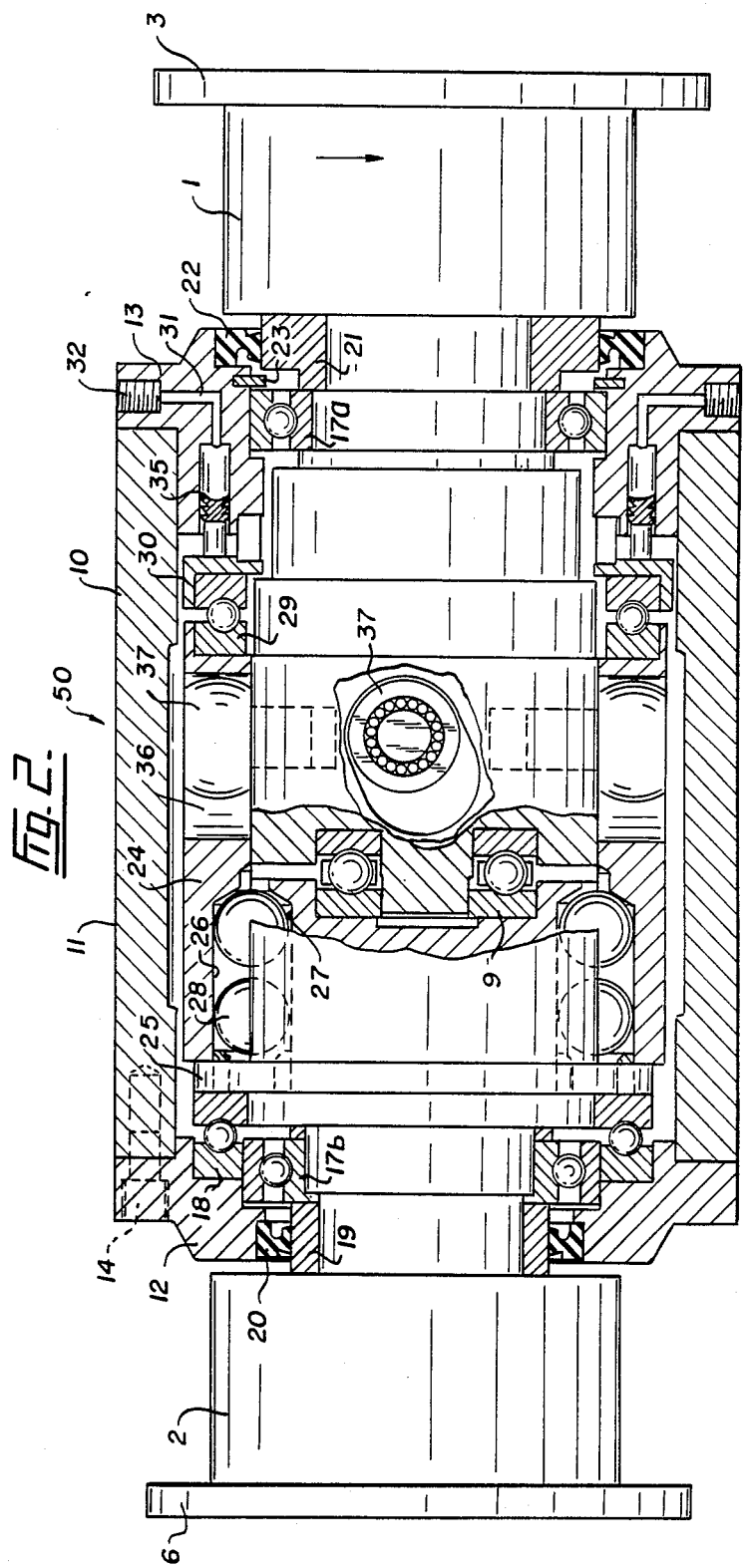
FIG. 2 is a side sectional view of the torque sensor.
Figure 3:
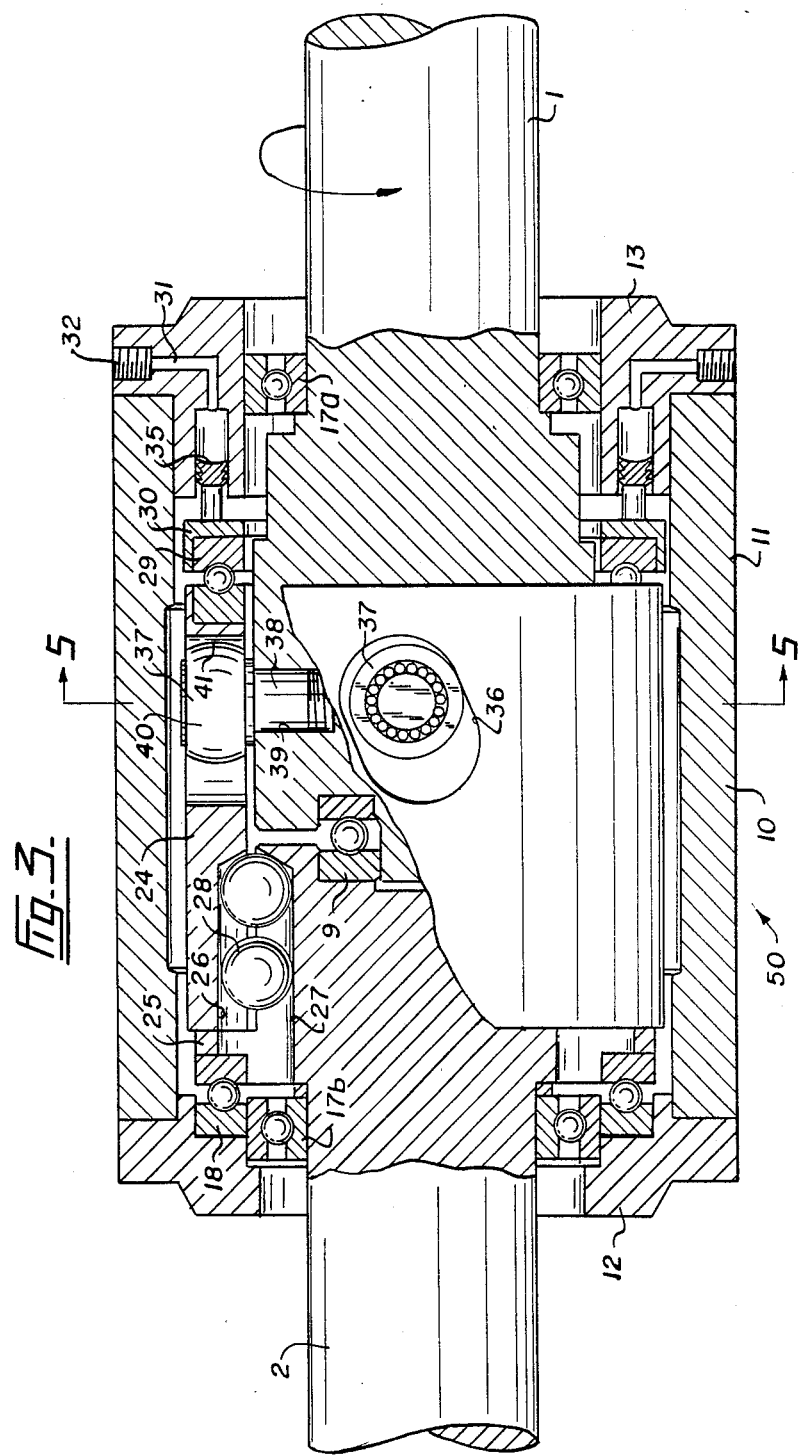
FIG. 3 is a side, partly sectional view of the torque sensor in the unloaded condition.
Figure 4:
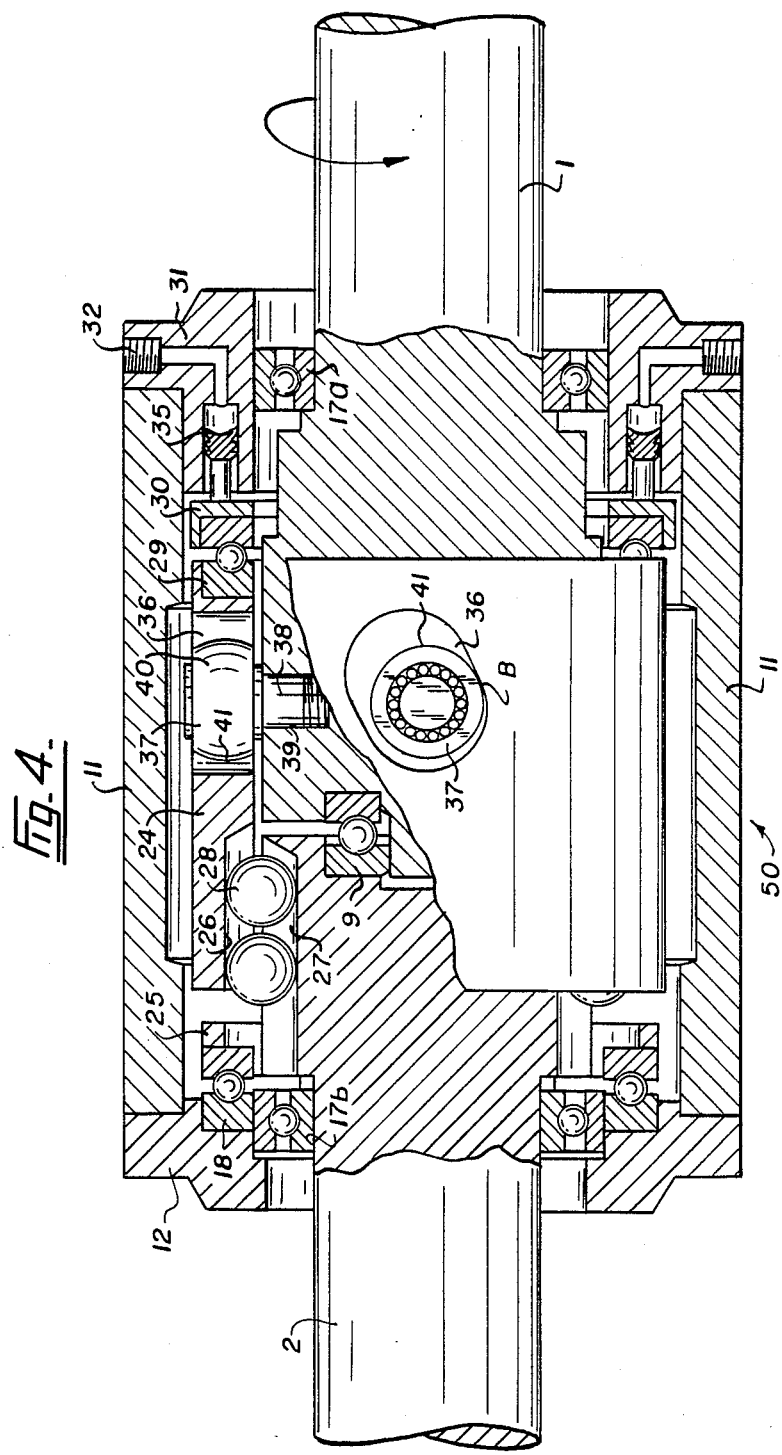
FIG. 4 is a view similar to FIG. 3, showing the torque sensor in a loaded condition.

The torque sensor 50 shown in the drawing comprises a motor shaft 1 and a load shaft 2, coaxially arranged end to end. The motor shaft 1 has a flange 3, for connection with the drive line 4 of a motor 5. The load shaft 2 also has a flange 6, for connection with the drive line 7 extending to the load 8.

The inner ends of the shafts 1, 2 are separated by a thrust bearing 9. Thus axial thrust force may be transmitted from the motor shaft 1 to the load shaft 2, but the motor shaft is still free to rotate or oscillate relative to the load shaft.

The shafts 1, 2 are mounted for rotation in a rigid, fixed housing 10. More particularly, the housing 10 comprises a cylindrical member 11, a load end housing member 12, and a motor end housing member 13. These three members 11, 12, 13 are secured together by capscrews 14 to form a rigid unit. As shown in FIG. 1, a ring 15 is secured to the exterior surface of the cylindrical member 11. This ring 15 abuts a non-movable cross-member 16 of the rig (not shown), to fix the housing 10 against movement. The shafts 1, 2 are aligned and mounted for rotation within the housing 10 by ball bearings 17a, 17b.

The load shaft 2 abuts a thrust bearing 18 which, in turn, abuts the housing member 12. Thus, axial force transmitted to the load shaft 2 by the motor shaft 1 is transmitted through the thrust bearing 18 to the fixed housing 10. The thrust bearing 18 and housing 10 function to prevent axial displacement of the motor and load shafts 1, 2.

A spacer 19 and a seal ring 20 effect an oil-tight seal between the load shaft 2 and the housing member 12. Similarly, a spacer 21 and a seal ring 22 effect an oil-tight seal between the motor shaft 1 and the housing member 13. Thus the housing 10 may be filled with oil, to lubricate the internal working parts.

A snap ring 23 connects with the housing 10 to hold the ball bearing 17a against axial displacement, thereby locking the motor shaft 1 against axial displacement.

In summary, therefore, there is provided a rigid, fixed housing 10 and the shafts 1, 2 are rotatably mounted therein and are fixed against axial displacement. The motor shaft 1 can transmit axial force to the load shaft 2, but the former is still free to oscillate relative to the latter.

A cylindrical sleeve 24 encases the adjacent ends of the shafts 1, 2 with a slip fit. When at rest, the load end of the sleeve 24 abuts a shoulder 25 of the load shaft 2. The sleeve 24 has a series of circumferentially spaced internal grooves 26 extending longitudinally in from its load end. Similarly, the load shaft 2 has matching grooves 27 formed in its motor end. Balls 28 are positioned in the grooves 26, 27, to function as splines connecting the sleeve 24 and load shaft 2 for rotation while permitting the sleeve to slide longitudinally.

At its motor end, the sleeve 24 abuts a thrust bearing 29 which, in turn, abuts a piston member 30.

The housing member 13 forms a passageway 31 terminating in a threaded port 32. A conduit 33 interconnects the port 32 with a Bourdon tube 34.

The piston end 35 of the piston member 30 extends into the passageway 31.

Thus, if the sleeve 24 is moved toward the motor end, the sleeve biases the piston member 30 into the passageway 31, thereby pressurizing hydraulic fluid filling the passageway. This increase in hydraulic pressure is reflected by the reading of the Bourdon tube 34.

The sleeve 24 has four helical slots 36 milled through its wall at 90° intervals to each other. The slots 36 are milled at a slope of 25° to the axis, although this angularity may be varied.

The motor shaft 1 carries four cam followers 37, each of which extends into a slot 36 and bears against the slot wall. The cam followers 37 each comprise a stud 38, threaded into a radial bore 39 in the shaft, said stud carrying a needle bearing-mounted roller 40 at its outer end. The roller 40 has a convex surface 41 which bears against the wall surface of the slot 36.

In operation, when torque is applied to the motor shaft 1, the shaft will be caused to rotate. The torque applied to shaft 1 places the cam followers under compression against the slot walls. A circumferential force is transmitted to the sleeve 24 by the cam followers 37 at the contact point B. This force causes the sleeve 24 to move axially away from the load end and to bias the piston member 30 and pressurize the fluid in the passageway 31. An equal and opposite force is transmitted by the motor shaft 1 to the load shaft 2 through the thrust bearing 9. This force is dead ended through thrust bearing 18 in the housing 10. This latter force operates to couple the shafts 1, 2 together. During this "lock up", the motor shaft 1 is still free to oscillate relative to the load shaft 2 because of the separation of the shafts and the presence of the thrust bearing 9. Torque is transferred from the motor shaft 1 to the sleeve 24 through the cam followers 37. In turn, the torque is transmitted from the sleeve 24 to the load shaft 2 through the balls 28. Thus the shafts 1, 2 rotate together. The balls 28, while loaded tangentially by the sleeve 24, are still free to roll axially in the grooves 26, 27 to permit the sleeve to slip axially, to indicate variations in torque.

The embodiments of the invention in which an exclusive property or privilege is claimed are defined as follows:

1. A torque sensor for use in the drive line connecting a motor means and a load means, comprising:
   a first shaft adapted to be connected to the longitudinally stationary output shaft of the motor means;
   a second shaft adapted to be connected to the longitudinally stationary input shaft of the load means;
   said first shaft being arranged end to end relative to the second shaft, said first and second shaft ends being spaced apart by thrust bearing means, whereby axial force may be transmitted from the first shaft to the second shaft and yet the first shaft may rotate relative to the second shaft;
   a sleeve encasing the adjacent ends of the first and second shafts;
   means for slidably interlocking the sleeve with the second shaft, whereby torque applied to the sleeve is transmitted to the second shaft, while permitting the sleeve to be moved longitudinally;
   said sleeve forming a plurality of circumferentially spaced, helically arranged slots in that portion of the sleeve encasing the first shaft end, said slots being slanted in the direction of rotation of the first shaft;
   said first shaft having a plurality of cam followers, each arranged to extend into one of the slots, to engage an inclined wall surface of said slots, whereby, as torque is applied to the first shaft, the cam followers transmit the torque to the sleeve and the sleeve advances along the first shaft in a direction away from the second shaft;
   a housing encasing the sleeve and adjacent ends of the first and second shafts, said housing being adapted to be fixed against movement;
   thrust bearing means disposed beteen the second shaft and the housing, whereby the second shaft may rotate but axial force applied to the second shaft by the first shaft is transmitted to the fixed housing;
   means, adapted to be biased by the sleeve when the latter moves longitudinally for generating a signal indicative of the extent of sleeve movement, thereby providing a measure of torque.

* * * * *